United States Patent [19]

Chater et al.

[11] Patent Number: 5,336,523
[45] Date of Patent: Aug. 9, 1994

[54] METHOD OF COATING AND TESTING A TANK

[75] Inventors: Garry D. Chater, Toongabbie; George Wilson, Winston Hills, both of Australia

[73] Assignee: Rheem Australia Limited, Rydalmere, Australia

[21] Appl. No.: 602,288

[22] PCT Filed: May 23, 1989

[86] PCT No.: PCT/AU89/00226
§ 371 Date: Dec. 27, 1990
§ 102(e) Date: Dec. 27, 1990

[87] PCT Pub. No.: WO89/11344
PCT Pub. Date: Nov. 30, 1989

[30] Foreign Application Priority Data

May 24, 1988 [AU] Australia .................... PI8405

[51] Int. Cl.$^5$ .............................................. B05D 7/22
[52] U.S. Cl. .................................. 427/231; 118/50; 118/408; 118/421; 427/232; 427/234; 427/238; 427/239; 427/240; 427/295; 427/235
[58] Field of Search ............. 427/238, 295, 239, 240, 427/235, 231, 232, 234; 118/50, 408, 421

[56] References Cited

U.S. PATENT DOCUMENTS

| 2,039,178 | 4/1936 | Martin | 427/238 |
| 2,070,368 | 2/1937 | Martin | 427/238 |
| 2,668,782 | 2/1954 | Gross | 427/235 |
| 3,447,946 | 6/1969 | Roe | 427/233 |
| 4,273,811 | 6/1981 | Okamoto et al. | 427/238 |
| 4,351,859 | 9/1982 | Hartmann | 427/238 |

FOREIGN PATENT DOCUMENTS 837951 6/1960 United Kingdom .

*Primary Examiner*—Janyce Bell
*Attorney, Agent, or Firm*—Ladas & Parry

[57] ABSTRACT

A method of applying a liquid coating material to the inside of a tank(10) and performing a hydrostatic pressure test on the tank at the same time. The method is useable for applying a liquid vitreous enamel coating material to a water heater tank, to be subsequently dried and furnace heated to form a glazed enamel internal coating. Preferably the hydrostatic pressure test is performed by displacing coating material from a portion(68) of an accumulator(51) by pumping liquid into a flexible bladder(66) housed in the accumulator. Pressure from pump(76) is transmitted to the tank(10 by the liquid coating material and held for a prescribed time interval to prove tank integrity. The method avoids excessive shear, hence viscosity changes in thixotropic coating materials.

7 Claims, 2 Drawing Sheets

METHOD OF COATING AND TESTING A TANK

BACKGROUND

This invention relates to a method and apparatus for treating tanks requiring both internal coating and pressure testing.

It has application to many items of manufacture but has particular application in the field of serially produced mains pressure water heaters which include a vitreous enamel internally coated steel tank. For convenience the invention will be described in relation to the example of the vitreous enamel lined steel tank, its wider applicability being thus made apparent.

The invention is illustrated in relation to a process of treating the internal surface of a water heater tank with a vitreous enamel coating material in liquid form, hereinafter referred to as slip, involving the filling of the substantially assembled tank with slip, testing the structural integrity of the thus-far assembled tank by application of a stipulated hydrostatic internal pressure to the tank, that pressure being transmitted by the slip medium itself. Further steps comprise emptying the tank of slip in a manner effective in controlling the amount of the residual wet slip coating left adhering to the tank walls, improving the uniformity of the thickness of the wet coat, drying the coat and furnace heating to melt the dried slip to form a glazed enamel corrosion protection layer strongly resistant to the corrosive effect of prolonged hot water contact.

In order to highlight differences between the present invention and what has been previously done, it is explained that manufacturing steps for mains pressure electrically heated storage water tanks comprise formation of at least three components. These are a cylindrical body and two curved ends. Under a procedure to be discontinued by the adoption of the method described in relation to the present invention, the body and top end are assembled together—the top end concave to the tank interior and then welded circumferentially around the outside of the junction of the two assembled parts.

The welded top and body component are then internally spray coated with slip and the bottom is also sprayed with slip on the convex face. The parts are then dried at a rate sufficiently slow to avoid spalling-off or any other deterioration of the coating during subsequent operations. After drying the separate parts are furnace heated to melt the solids content of the slip, the result being that the parts are coated by a glazed enamel coating.

The bottom is then assembled to the bottom of the tank, convex side inward, and circumferentially welded around the junction.

A disadvantage of this known technique is that great skill and control is required in performing the welding process in order that the glazed surface is not cracked or crazed by the heat of welding and that the weld achieves full metal fusion free of glass inclusion.

An alternative method of coating the interior of hollow vessels with vitreous enamel is known and is described in British patent 1 078 903. In this patent a process is described whereby a cylindrical tank having both curved ends already welded to the body has an opening in the centre of each end enabling liquiform enamel slip to be drawn into the lower end by vacuum applied to the upper end. After filling with enamel the tank is drained, dried and furnace heated. Known tanks for water heating and storage made using this process have, when completed for use, fitted to the bottom opening, a flange which is closed by a bolted-on plate through which pass fittings such as for supporting a heating element or coil, as well as a cold water inlet pipe. This is suited to traditional European practice of using bottom entry hot water storage tanks supported on walls. Elsewhere, preferred practice is to have floor standing hot water storage tanks with side entry and delivery water connections, side entry electrical heating element(s) and relief valve and a top central entry for an elongate anode for augmenting the protection given to the steel by the vitreous enamel coating.

Consumer demand for water heaters often requires a minimum height for the assembled complete heater when plumbed, for reasons of being able to fit the unit in restricted headroom such as under sinks, in cupboards or under houses. The European practice of smaller capacity, higher stored water temperature heaters with bulky flanges top and bottom and with plumbing and electrical entry at the bottom, does not suit certain consumers.

SUMMARY

In one aspect the present invention consists of a method of applying a vitreous enamel slip liquid coating material to the interior surface of a tank and pressure testing the tank, the method comprising the steps of placing the interior of the tank into liquid flow communication through a first opening with a supply of a liquid coating material, evacuating air from the tank through a second opening to cause the coating material to fill the tank, closing the second opening, increasing hydraulic pressure inside the tank by forcing additional coating material into the tank through the first opening, by displacement of the coating material from an accumulator connected to the tank by forcing said material out of the accumulator, maintaining said increased hydraulic pressure as a pressure test required on every tank coated using the method, coding the tank for diversion if said increased hydraulic pressure is not maintained, reducing said hydraulic pressure in the tank, forcibly expelling the excess coating material from the tank through the first opening leaving a residual coating layer on said interior surface, drying the residual coating layer and causing the dried layer to be hardened to a protective coating on the tank interior surface.

In one preferred aspect of the present invention as above described the liquid coating material is displaced from the accumulator by pumping water into an interior side of a flexible bladder in the accumulator, the flexible bladder providing a physical separation at all times between the coating material and the water.

The present invention consists, in a another aspect of a tank treated using the method substantially as above and further described.

The present invention consists, in a further aspect, of apparatus for filling a tank with a liquiform coating material and pressure testing the tank by application of hydrostatic pressure to the tank.

BRIEF DESCRIPTION OF THE DRAWINGS

The invention is described in more detail with respect to a presently preferred version of the process, apparatus and end product, by way of an example and variations thereof, with reference to the accompanying illustrations in which.

DETAILED DESCRIPTION

Figure 1A:
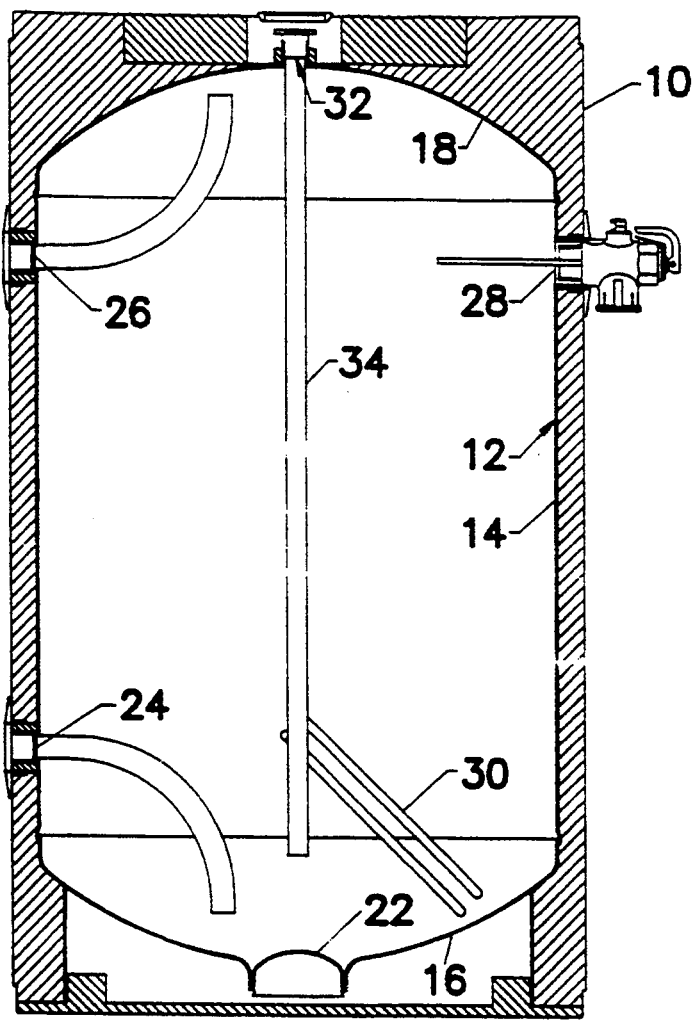
FIGS. 1A, 1B and 1C is a cross-sectional elevation of a mains pressure water heater containing a hot water storage tank of the type to be coated by the method and apparatus of the present invention, including a detail view of the bottom end of the tank and bottom end plug.
Figure 1B:
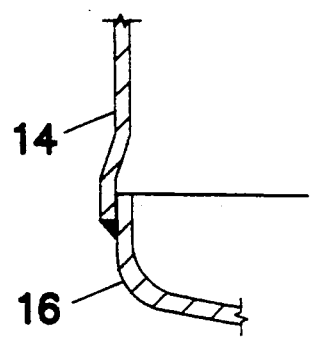
Figure 1C:
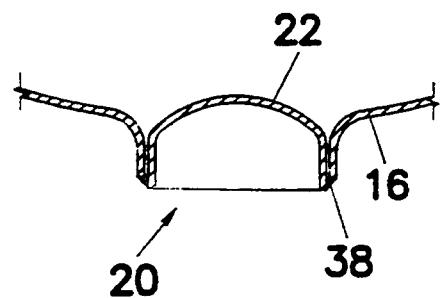

Referring to FIG. 1, the water heater 10 comprises a steel storage tank 12 having a cylindrical body 14, bottom end 16 and top end 18. The bottom end 16 has a central opening 20, closed off permanently (after the tank is internally coated with fused vitreous enamel) by steel plug 22.

The body 14 is first rolled from flat sheet steel and butt welded longitudinally to form a cylinder.

The body 14 and ends 16, 18 are then joined by circumferentially welding the assembled components, the joint in each case being of the joggled and overlapped type as shown in one of the two detail views associated with FIG. 1.

Prior to assembly of the ends 16 and 18 to the body 14, a number of openings are formed in the body. These include cold water inlet 24, hot water outlet 26, and combined temperature and pressure relief valve outlet 28. Not shown is an opening to insert the heating element 30. These openings have threaded bushes welded to each, outside the wall, except the opening for the element which is a flanged unthreaded bush.

The top end 18 is provided with a central opening 32 which in the finally assembled water heater is used to screw in anode 34 used to augment the tank internal coating protection by sacrificially protecting the underlying steel substrate against the possibility of imperfections in the vitreous enamel internal coating.

After below describing the apparatus and method for treating the tank, with reference to FIG. 2, further aspects concerning the plug 22, its coating and subsequent fit-up to the opening 20 and the welded connection between the bottom end 16 and plug 22 are described.

Other components of the fully assembled heater as depicted in FIG. 1 are recognisable to a person skilled in the art by inspection and since they do not form part of the present invention, are not further described.

Figure 2:
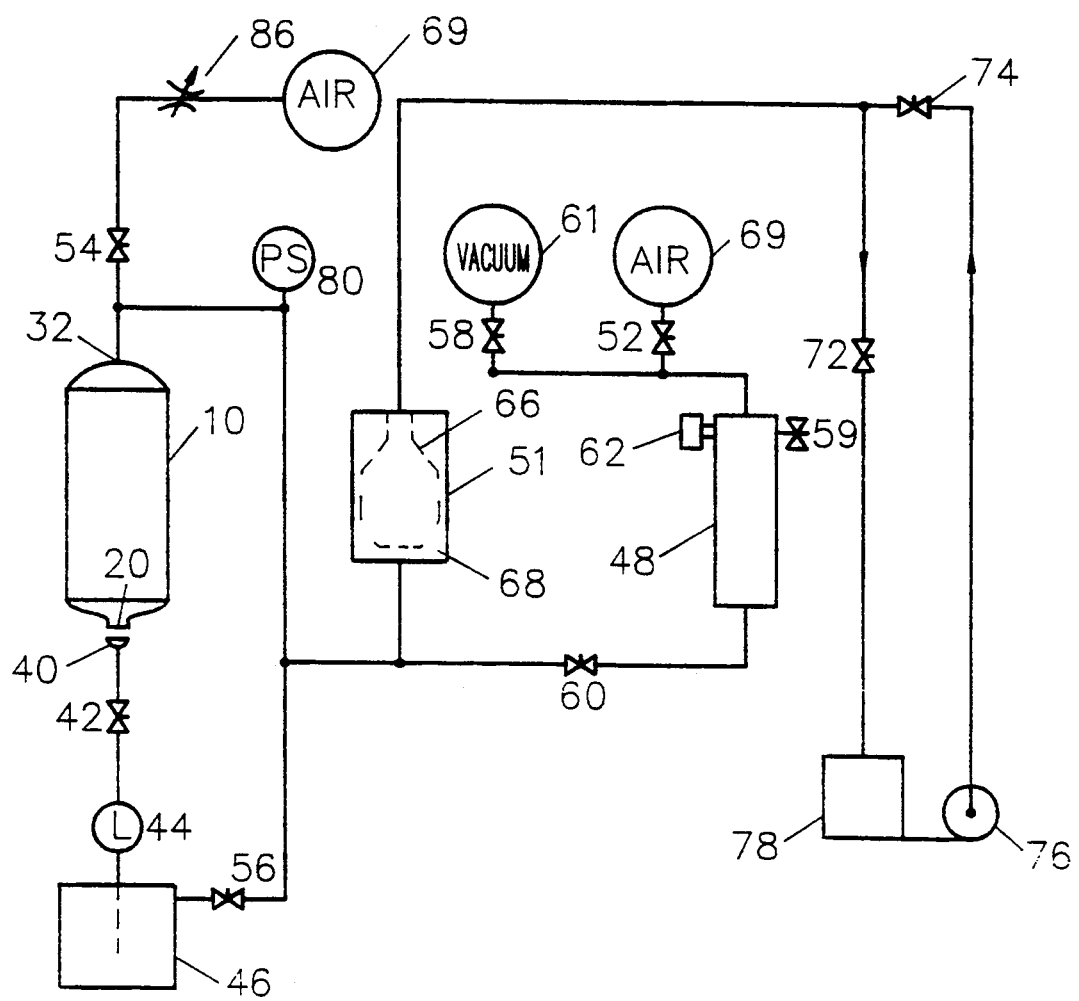
FIG. 2 shows schematically apparatus in accordance with one aspect of the present invention.

Referring to FIG. 2, the apparatus for performing the subsequently described processes on hot water tank 10 comprise the following items whose function in the method will be described later in more detail.
40 Mating flange
42 Valve
44 Level probe
46 Slip storage vessel
48 Reservoir (multi purpose)
51 Accumulator
52 Valve
54 Valve
56 Valve
58 Valve
59 Valve
60 Valve
61 Vacuum pump
62 Level probe in reservoir
66 Flexible bladder
68 Accumulator space
69 Air supply
72 Valve
74 Valve
76 Pump
78 Water storage
80 Pressure switch
86 Valve In FIG. 2 solid unbroken lines represent piped connections joining the referenced items named as in the above list.

Appropriate flexible connections are provided in the region of the tank openings for connection of the apparatus to the tank to be treated.

FIG. 2 is schematic and actual physical location of the items, pipes and valves may vary from that suggested by the illustration.

The method of treating the tank according to the invention using the apparatus is now described.

Referring to FIG. 2, cylindrical hot water storage tank 10 is clamped upright in a process station, all openings except the top and bottom being plugged. Bottom opening 20 is clamped against mating flange 40 to provide a sealed interconnection between the tank interior, valve 42, level probe 44 and liquid slip storage vessel 46. The top opening 32 (anode entry) is connected to the bottom end of the reservoir 48 and the bottom end of the accumulator 51 among other items to be described below.

To commence the tank coating and testing process valves 50, 52, 54, 56 and 59 are closed and valves 42, 58 and 60 are opened. This results in slip being drawn by vacuum, sourced by inclusion of vacuum pump 61, from the slip storage vessel 46 into the tank 10 and into the reservoir 48 until a level probe 62 in the reservoir senses the presence of slip at least partly filling the reservoir 48, at which time valve 42 is closed. During the filling cycle, valve 74 is open and valve 72 is closed allowing water to be pumped into the bladder 66. When slip has reached level probe 62, and valve 42 has closed, valve 74 closes and valve 72 opens allowing depressurisation of bladder 66. Valve 58 also closes.

Valve 52 opens, causing air pressure from air supply 69 to displace slip from the reservoir into the space outside of the bladder in the accumulator termed the accumulator space 68. Valve 60 is then closed and valves 74 opened and 72 closed.

Water is then pumped by pump 76 from water storage 78 into the top end of the accumulator 51, that is, to the inside of bladder 66. Water continues to be pumped into the bladder which thereby expands, displacing slip out of the accumulator space 68 into the interconnecting pipeline from the bottom of the accumulator to the top of the tank 10.

Pump 76 delivers water into the bladder until, in the absence of leakage, a required test of for example 1500 kPa is attained in the pumped water part of the circuit, this pressure being effectively transmitted undiminished through the bladder (at non-flow equilibrium) and thus pressurises the tank interior to the required hydrostatic pressure test intensity.

Pressure switch 80, in direct communication with the tank interior is pre-set to time a selected interval of at least one second but preferably about 10 seconds during which the pressure in tank 10 is maintained so long as no leakage occurs.

Should the tank fail the pressure test by rupturing, the limited volume of slip in the accumulator ensures a safe, low energy release failure, because only a small volume of slip is available to be expelled from the point of leakage before the bladder fully occupies the accumulator body and hence no more than a relatively small quantity of pressurised slip can escape from the detected rupture. If the required test pressure is not maintained, then the tank is coded for subsequent diversion from the production line (not shown).

At completion of the above described tank pressurisation phase, valves 42 and 54 are opened.

Compressed air from receiver 69, controlled to a pre-determined flow rate by valve 86, is introduced into the top opening of the tank, through valve 54 displacing the slip from the tank through valve 42 and level control sensor 44 into the slip storage vessel 46. The rate at which slip is displaced from the tank is controlled in order to leave a residual coating of predetermined required thickness on the inside surface of the tank.

Instantly level control 44 becomes uncovered by the expelled slip, valve 54 closes to ensure that the slip in the storage vessel 46 is not excessively mixed by aeration due to compressed air following the displaced slip.

The air supplied to the tank in order to displace the slip has a maximum pressure of 700 kPa although in the absence of equipment malfunction the effective air pressure at any instant inside the tank during the air driven expulsion of the slip is substantially less than 700 kPa. Since the tank has already been tested hydrostatically, as described for this particular example, at 1500 kPa, it is acceptable to statutory authorities concerned with safe operation of pressure vessels to use, but only after such testing compressed air to cause the tank to be drained at the relatively fast rate required to achieve optimum residual coating thickness. Without such prior hydrostatic testing above 700 kPa the air pressurisation step would not be regarded as safe.

If only gravitational flow out were to be used to drain out the slip, the same degree of control of the thickness of the residual layer would not be available and the process time cycle would be undesirably lengthened.

After expulsion and draining of the slip and cylinder 10 has been unclamped from the mating flange 40, valves 60 and 56 are opened and air is allowed to enter the reservoir 48 through air vent 59. This allows the slip that has accumulated in the line to drain back into slip storage vessel 46.

After draining of the slip the coated and hydrostatically pressure tested tank is conveyed to subsequent operations to further improve uniformity of coating thickness including:
- spinning the tank about its longitudinal axis, that axis being inclined sequentially at more than one angle of inclination:
- shaking the tank while suspended to remove any drops of slip accumulated at the bottom end of the tank (note that the bottom opening is radiused to facilitate the shaking free of drops of slip);
- drying the tank to remove moisture out of the slip coating, and
- passing the tank through a high temperature furnace to fuse the slip coating to a glazed vitreous enamel, being a hot water resistant corrosion protection to the steel tank interior.

Following cooling of the enamelled tank the separately vitreous enamel coated end cap 18 which suitably may be 50 to 100 mm diameter and, preferably 76 mm diameter is, inserted in the bottom opening, the external fillet area is abrasive blasted to remove all enamel and the full circumference of the plug to bottom end is welded to seal the bottom of the tank.

The type of closure of the bottom end of the tank is advantageous in the following respects.

The end plug is convex to the tank interior (see detail of FIG. 1) with the result that it can be telescoped into the mating opening leaving a steel "fin" projecting outwardly from the welded joint 38. This fin provides advantageous attributes of shape conducive to achieving a high quality weld entailing high heat input, since the fin effectively radiates welding heat away from the enamelled side of the joint thus protecting the interior enamel adjacent to the welded joint from the heat cracking.

Secondly, the possible disadvantageous consequences of a high heat input to the enamel (from the welding operation) are minimal since any small amount of heat degraded enamel will be confined to the crevice adjacent the plug-to-end join which in service in a region of the heater which, due to temperature stratification and element location is relatively cool. Thus the possibility of enamel degradation adjacent to the weld is minimised by the design of the joint and the choice of location of the welded joint relative to the tank as a whole.

The welded bottom end closure is more advantageous than alternative arrangements known to be widely used in Europe, where common practice is to manufacture the bottom end opening terminating in a length of cylindrical pipe of inside diameter approximately 100 to 140 mm, the end of which distant from its attachment to the bottom end of the tank is flanged. This flange is for mating with a flange carrying the heating element and cold water inlet connection. This results in a considerable increase in the overall height of an assembled water heating of a given capacity and diameter. It also requires that the heater be mounted off the floor, such as on a wall, in order to provide maintenance access to the heating element.

USES AND ADVANTAGES

A heater made according to this invention may have known side openings for each connection, comprising hot and cold water connections, the heating element and the combined temperature and pressure relief valve.

The completely installed heater may be floor mounted and may have optimum available capacity for a restricted height location such as under a house, in a cupboard or in any other restricted headroom space.

The advantages of the foregoing process extend beyond the improvement in manufacturing efficiency resultant from combining the slip coating and hydrostatic pressure testing. Pressure to which the tank interior is subjected while contacted by the enamel slip assists in impregnating the slip into crevices and joints around the body-to-end welds in particular and also importantly into any minor roughness or imperfections remaining after completion of the longitudinal weld of the body.

An advantage of the described method relates also to the fact that vitreous enamel slip exhibits thixotropic properties. As a consequence, when handling the liquid slip between containers by pumping and the like, excessive shear is to be avoided, otherwise very marked uncontrolled viscosity changes occur.

If, in the process of the present invention, the viscosity of the slip at the time of drain-out from the tank is not in control, then the vitally important residual coating thickness will not be correct. A great benefit, therefore, of the described apparatus and method, when applied to any liquid coating material displaying significant thixotropicity, is that shear of the liquid is substantially avoided by the inclusion in the apparatus of the rubber bladder accumulator, wherein only a small volume of liquid coating material is moved through the system to pressurise the tank.

The alternative of direct centrifugal pumping of the slip itself to create the required internal pressure, would result in excessive shear thickness of the liquid in the pump, thus reducing the viscosity and hence coating in an uncontrolled manner.

We claim:

1. A method of applying a vitreous enamel slip liquid coating material to the interior surface of a tank and pressure testing the tank, the method comprising the steps of placing the interior of the tank into liquid flow communication through a first opening with a supply of a liquid coating material, evacuating air from the tank through a second opening to cause the coating material to fill the tank, closing the second opening, increasing hydraulic pressure inside the tank by forcing additional coating material into the tank through the first opening from an accumulator connected to the first opening, maintaining said increased hydraulic pressure as a pressure test required on every tank coated using the method, reducing said hydraulic pressure in the tank, forcibly expelling the excess coating material from the tank through the first opening leaving a residual coating layer on an interior surface, drying the residual coating layer and causing the dried layer to be hardened to a protective coating on the interior surface.

2. A method as claimed in claim 1 in which the coating material is displaced from the accumulator by pumping water into a first side of a flexible bladder in the accumulator, the bladder providing a physical separation at all times between the water and the coating material on a second side of said bladder.

3. A method as claimed in claim 1 in which said increased hydraulic pressure is 1500 kilopascals.

4. A method as claimed in claim 1 in which said increased hydraulic pressure is maintained for 10 seconds.

5. A method as claimed in claim 1 including the further steps carried out before drying the residual coating layer of spinning the tank about its longitudinal axis, that axis being inclined sequentially at more than one angle of inclination and shaking the tank while suspended.

6. A method as claimed in claim 1 in which the step of forcibly expelling the excess coating material from the tank is performed by introducing compressed air at a maximum pressure of 700 kilopascals into the tank through said second opening.

7. Apparatus for filling a tank with a liquid coating material and pressure testing said tank including:

a combined filling and testing station having a first pipe to connect a first opening of the tank to a storage reservoir of the coating material;

a second pipe having a valve therein to connect a second opening of the tank to either compressed air or vacuum;

an accumulator vessel having an interior volume divided into two compartments by a flexible bladder incorporated therein:

a water pump connected by a third pipe to enable pressurisation of one of said compartments of the accumulator;

and a fourth pipe to connect the other said compartment of the accumulator to the storage reservoir of the coating material.

* * * * *